Nov. 3, 1959 A. G. MUELLER 2,911,579
DIFFERENTIAL CONTROL CIRCUITS FOR REGULATOR SYSTEMS
Filed May 8, 1956
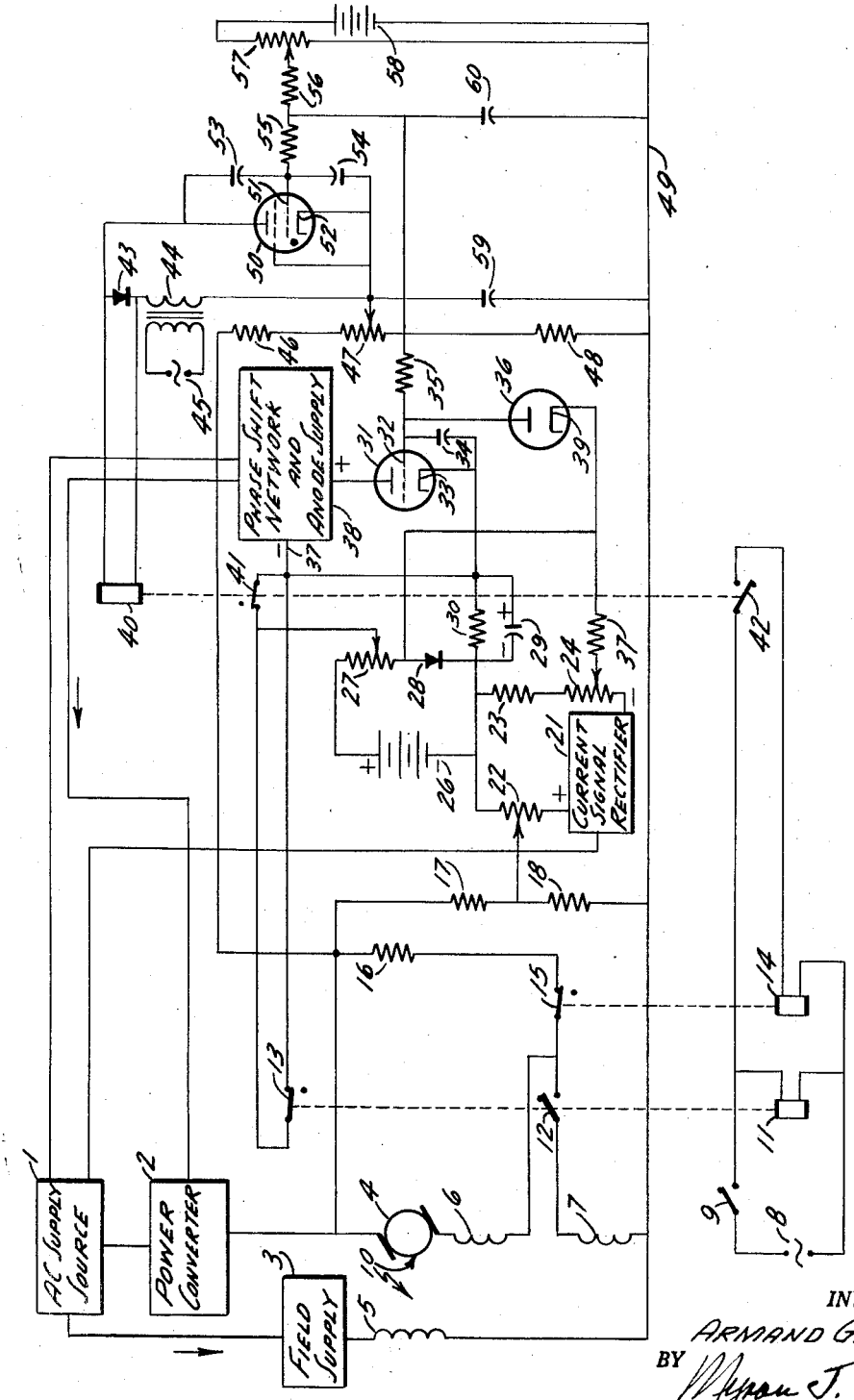
INVENTOR.
ARMAND G. MUELLER
BY ND# United States Patent Office 2,911,579
Patented Nov. 3, 1959

2,911,579

DIFFERENTIAL CONTROL CIRCUITS FOR REGULATOR SYSTEMS

Armand G. Mueller, Wauwatosa, Wis., assignor to Square D Company, Detroit, Mich., a corporation of Michigan Application May 8, 1956, Serial No. 583,502

6 Claims. (Cl. 318—270)

The present invention relates to differential control circuits for regulating systems and more particularly to differential control circuits for regulating systems to detect the operating conditions of the system and control predetermined functions associated with said conditions.

In an adjustable voltage drive employing the Ward Leonard system there is no problem in obtaining a fast smooth deceleration since the motor acts as a generator, during the braking cycle, pumping back power into the D.C. supply. The present embodiment of the invention is directed to a quick slow down circuit in an electronic drive requiring fast deceleration from any given speed to a lower speed and a smooth turn-on of driving power when a lower speed has been reached, with a minimum of undershoot. Without a quick slow down feature a D.C. motor operating from an electronic controller merely coasts from the higher speed to the lower speed without any braking torque developed.

Most electronic motor controllers employ dynamic braking as a standard feature; however, additional circuitry is necessary for automatically braking when changing from high speed to low speed. The embodiment disclosed employs a circuit for automatically controlling the braking cycle; sensing the need for fast deceleration, connecting the dynamic braking resistor across the armature of the motor, and reducing the voltage applied across the armature from the source. The differential control circuit utilizes a normally conductive detector having a normally energized control circuit sensitive to supply failure to the detector element, an opened control circuit or detector element failure, and in event of failure prevent initial starting of the drive or de-energize a quick slow down relay to apply braking to the drive. A power converter supplying power to the load is conditioned by associated circuitry also operated by the differential control circuit during the braking sequence.

Machine tool or processing apparatus require braking from a fast operating speed to a lower speed in order that subsequent operations are co-ordinated. Serious breakdowns can result due to failure of the circuit to brake within a short period of time or failure to brake. It is therefore an additional requirement of the present invention to detect any malfunction in the quick slow down circuit or any component failure, and place the motor or drive in inoperative condition until the motor control circuit, and particularly the differential control and dynamic braking circuits, are fully operative. It is therefore an object of the present invention to provide a differential control circuit whose performance will meet with the requirements stated above.

Another object of the present invention is the provision of a differential control circuit for regulator system which is normally energized and is de-energized in response to predetermined conditions of the regulator system.

Another object is to provide a differential control circuit for automatic deceleration control by dynamic braking, in an adjustable speed motor control system.

Still another object is to provide a normally energized differential control circuit in an adjustable speed motor control system to automatically introduce a braking cycle upon malfunction or failure of any component effecting the introduction of the braking cycle.

A further object of the present invention is the provision of a circuit for substantially decreasing the voltage applied to the armature winding of a motor during a braking cycle.

Further objects and features of the invention will be readily apparent to those skilled in the art from the specification and appended drawing illustrating a preferred embodiment.

Referring now to the drawing, there is shown a preferred embodiment of differential control circuit for a regulator system in which an electrical motor 10 having an armature winding 4, is connected in a feedback control regulator circuit regulating the voltage applied across the armature by controlling the power converter 2 supplied from an A.C. supply source 1. The motor field 5 is connected in shunt with the armature 4 and to the A.C. supply source 1 through a field supply 3 which may include a field feedback regulator circuit to control the field excitation.

A dynamic braking resistor 16 is shown connected across the motor armature winding 4 through contacts 15 of the dynamic braking contactor 14. The dynamic braking circuit presents a convenient form for presentation, although it should be realized that a differential control circuit may be utilized to regulate or govern any other apparatus needed as a result of the variations in regulation parameters.

The feedback control system for the motor armature 4 has been shown in detail and includes an IR compensation network, current limit regulator circuit, comparator circuit, a speed reference input for the comparator and a phase shift network controlling a power converter supplying armature voltage.

The differential control circuit includes the differential detector having two control elements which are coupled to the reference source and an armature voltage source respectively. The armature voltage source is preferably a function of either the voltage applied across the armature or the counter E.M.F. produced in the armature winding 4.

In this embodiment, the output of the differential detector controls the quick slow down relay 40, having contacts in the preconditioning circuit and in the alternating current relay control circuit, including contactor 14. The contactor circuit may include a separate source 8 for energizing the coil of the main contactor 11 upon closure of the run switch 9; and the coil of the dynamic braking contactor in series with contacts 42 of the quick slow down relay 40. The contacts 12 of the main relay circuit connects the armature winding, in series with commutator field winding 6 and series field winding 7, across the armature voltage D.C. supply. Contacts 15, controlling motor retardation, connect the dynamic braking resistor 16 across the armature winding 4 and commutator field 6. The circuit, as shown, is de-energized; energization of the circuit by the A.C. supply 1 actuates the quick slow down relay opening contacts 41 and closing contacts 42.

The circuit for speed regulation by armature voltage control includes a triode 31 having a grid 32 connected to the speed reference potential at the tap on the potentiometer 57 through resistors 35 and 56. Resistor 35 in the grid circuit and capacitor 34, connected between the grid and cathode of the triode 31, form a filter circuit preventing transient signal input to the grid; and resistor 56 in the grid circuit of detector 50 and capacitor 60 provide a time delay for the speed reference signal during the periods of acceleration. The compensated armature voltage signal, proportional to the counter E.M.F. is supplied to the cathode 33 from the IR compensation and preconditioning circuit networks wherein the difference in the counter E.M.F. feedback of the armature and reference voltage signals controls the conduction of tube 31, which in turn controls phase shift network 38, coupled in the plate circuit of tube 31.

The plate or anode supply circuit of regulator tube 31 has been shown separately from the system having a return to the cathode through the lead 37; the phase shift network 38, supplied from the A.C. supply source 1, is in the control circuit which is connected to the power converter 2, controlling the voltage applied to the armature winding 4.

The preconditioning circuit controls the holdoff bias potential of the cathode 33 of the regulator amplifier or comparator tube 31 and the limiting level of tube 36 in the armature current regulator circuit; and includes a D.C. source 26 in series with the resistor element of potentiometer 27 and rectifier 28. The operating level of cathode 33 of the comparator tube during normal operating conditions is determined by the grid to cathode bias, but is cut off during the braking cycle by the voltage across the capacitor 29 which is connected to a positive potential selected by potentiometer 27, wherein resistor 30 is connected across capacitor 29 to provide a delay discharge path for the capacitor upon opening of contacts 13 and 41.

The IR compensation network includes a current signal rectifier 21 for introducing a voltage in the loop circuit including the resistor elements of potentiometers 22 and 24 and resistor 23. The voltage output of the current signal rectifier 21 is a function of armature current which may be supplied by current transformers connected in the A.C. supply source for the armature. The tap of the potentiometer 22 is connected between resistors 17 and 18 across the armature winding 4, commutator field 6, and series field 7, forming an armature voltage divider. The resultant signal on the cathode of regulator amplifier tube 31 is proportional to the motor counter E.M.F. or motor speed.

The signal output of this network, which is a function of armature counter E.M.F., is taken off between resistor element of potentiometer 22 and the resistor 23 and coupled to the cathode of the comparator tube 31 through the resistor 30. A second output from the IR compensation network is taken at the tap of the potentiometer 24 for controlling the limiting level of the tube 36 and the level of the grid voltage of the comparator tube 31. The tap of the potentiometer 24 is connected to the cathode 39 through the resistor 37 whereby an increase in armature current lowers the cathode potential to limit the signal voltage level on the grid 32 controlling the voltage and current of the armature winding.

The differential detector circuit is equally applicable to either straight armature voltage control or armature and field regulation. The differential detector element has been shown as a tube 50 having a grid control input connected to a reference voltage source (speed adjustment) or the variable tap of the potentiometer 57, through a current limiting resistor 55 and resistor 56. A regulated D.C. voltage source 58 is shown as a battery connected across the resistor element of potentiometer 57, supplying reference signal to the regulator circuit as well as the detector circuit from the potentiometer tap.

The grid circuit of the detector tube 50 further includes a filter capacitor 54 connected between the grid and cathode, and capacitor 53 connected between the grid and plate to feed a small A.C. ripple to the grid 51. Resistor 56 connected in series between the speed reference potential and the grid 51 forms part of a RC timing network including capacitor 60 to delay changes in the speed reference potential signal applied to the comparator and detector inputs.

The cathode 52 of the detector 50 is shown connected to the adjustable tap of sensitivity potentiometer 47 in a second voltage divider network, including resistors 46 and 48 in series with the resistor element of potentiometer 47. Capacitor 59 is connected between cathode and ground return 49, to filter the armature voltage feedback signal at the adjustable tap of potentiometer 47 and prevent cycling of the quick slow down relay immediately after the braking cycle by introducing a slight time delay during the transition period.

The anode circuit of the detector tube 50 includes a relay 40 and an anode supply transformer 44 having a primary connected to an A.C. source 45; rectifier 43 is connected across the relay to insure positive operation of the relay 40. The difference in levels of the reference signal on the grid and the armature voltage signal on the cathode provide a bias between grid and cathode whereby the detector tube 50 is normally conductive; however, an increase in bias due to lowering the reference voltage or an increase armature voltage will cut off the tube, de-energizing the quick slow down relay 40 to start the braking cycle. In other words, an increased differential in voltage between cathode and grid or armature and reference signal will cut off the tube wherein the normal bias voltage and conduction determines the differential voltage necessary for cut-off.

*Operation*

In operation the A.C. supply source 1 supplies power to the field supply 3, power converter 2 and phase shift network 38. Field supply 3 may apply a constant or regulated D.C. voltage to the field winding 5; the power converter 2, supplying the armature winding 4 with a voltage regulated by the feedback control circuit. Completing the circuits to the A.C. supply source before closure of the armature circuit energizes the quick slow down relay 40 closing contacts 42 to the dynamic braking contactor and opening contacts 41 to the preconditioning circuit. Comparator tube 31 remains cut-off and capacitor 29 charged to the voltage setting on the potentiometer 27 since the contacts 41 are shunted by a path including contacts 13 completing the circuit across the condenser 29.

The motor is started by closing the run switch 9 connecting the main contactor coil 11 across the supply source 8. The contactor coil 11 closes contacts 12 completing the armature circuit and opens contacts 13 to the preconditioning circuit. The hold-off bias on the cathode of the comparator tube 31 is decreased as the capacitor 29 discharges through a resistor 30, and the regulator circuit is placed in operation controlling the voltage across the armature in accordance with the speed reference potential setting.

In the regulating circuit, the armature voltage feedback signal is applied to potentiometer 22, and the armature current feedback signal taken from the current transformers in the armature supply is applied to the current signal rectifier 21. The two armature feedback signals are combined, the voltage signal corrects for the IR drop in the armature circuit, having an output signal which is a function of the counter E.M.F. of the motor armature, which is applied to the cathode of comparator tube 31. The reference signal taken from the speed potentiometer 57 is applied to the grid of the tube 31 controlling the tube output or amplified error signal fed to the phase shift network 38.

The comparator output signal controls the phase shift network output or phase shift control signal applied to the power converter to regulate the armature voltage to the speed adjustment setting on the potentiometer 57. The armature current regulating circuit, which is coupled between the IR compensation network and the grid of the comparator tube 31, limits the speed reference potential on the grid 32 by lowering the voltage on the cathode 39, causing diode 36 to conduct and limit the potential on grid of tube 31 whenever the current signal output exceeds the current limit reference consisting of D.C. supply 26, resistor 27 and rectifier 28. This regulating circuit protects the motor against currents exceeding the maximum safe armature current limit.

The differential control circuit senses armature voltage exceeding the speed reference adjustment during deceleration. Adjustment of the speed reference potential in either field or armature regulator circuits, produces an armature voltage feedback signal tending to exceed the armature voltage speed reference. The difference between the armature voltage and speed reference potential is detected and controls an indicator or any other device or apparatus for automatically applying the corrective measures desired until the desired or normal differential is restored.

In the present embodiment the control circuit connects the dynamic braking resistor 16 across the armature to develop the braking torque necessary to quickly decelerate to the lower speed selected by the speed reference potentiometer. The differential detector or the tube 50 being conductive in response to a difference normal to the input signals, normally energizes the quick slow down relay 40 in the control circuit; however, in response to an increased differential of said signals the detector 50 becomes non-conductive and de-energizes relay 40, closing contacts 41 in the preconditioning circuit and opening contacts 42 in the dynamic braking coil circuit.

Dynamic braking contactor coil 14, upon de-energization, closes contacts 15 connecting the dynamic braking resistor across the armature; developing the load and braking torque necessary to dissipate the rotational energy developing the excess armature voltage over the reference speed setting. Also, as stated supra, the closing of the contacts 41 in the preconditioning circuit charges the capacitor 29, cutting off the comparator tube 31 to prevent any additional voltage from being applied to the motor armature.

With the dynamic braking resistor across the armature winding 4, the motor quickly decelerates to the speed setting of potentiometer 57, whereupon the armature voltage signal at the detector tube decreases to a point where the differential in signal outputs is unable to hold tube 50 below cutoff, whereupon the tube regains conduction, energizing the control circuit and the quick slow down relay, opening contacts 41 and 42, de-energizing dynamic braking contactor coil 14, opening the circuit across the armature to the dynamic braking resistor 16. After the contacts 41 have opened, capacitor 29 discharges through resistor 30, decreasing the bias on the comparator tube 31, and gradually restoring the regulator circuit to normal operation, regulating the power applied to the armature winding 4.

A separate armature voltage signal source has been shown for the detector element 50, i.e., voltage divider network, including resistors 46, 48 and potentiometer 47. However, it should be realized that the counter E.M.F. signal or IR compensated signal from the armature which is available at the upper end of resistor 23 in the IR compensation circuit may be utilized to provide the armature voltage signal on the cathode of the detector tube 50.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

I claim:

1. In a control circuit for a D.C. motor, the combination comprising; a variable output supply source for the motor, a first and a second armature voltage signal source responsive to the counter E.M.F. of the armature, an adjustable speed reference signal voltage source, means having a single electronic switch unit having control elements coupled with the first armature voltage signal source and speed reference signal voltage source for controlling the output of the variable supply source and means including a differential detector having a second single electronic switch unit having control elements coupled with the second armature voltage signal source and speed reference signal voltage source for controlling the energization of a control circuit independently of the control of said variable source by said first means, said single electronic switch unit of the differential detector being conductive in response to a difference normal to said signals to energize said control circuit and non-conductive in response to an increasing differential in said signals to de-energize said control circuit.

2. In a control circuit, the combination comprising; an electrical load, a variable supply source for supplying the load, a first signal voltage source connected to be responsive to the counter E.M.F. of the load, a second signal voltage source connected to be responsive to the voltage drop across the load, an adjustable reference signal source, means having a single electronic switch unit having control elements connected to the first signal source and the reference signal source for controlling the output of the variable supply, loading means including a dynamic braking element conectible with the load for loading the electrical load, and means having a second single electronic switch unit having control elements connected with the second signal source and the reference signal for controlling the connection between the electrical load and the loading means.

3. In a control circuit for a D.C. motor, the combination comprising; a variable supply source for supplying the motor, a first signal voltage source connected to be responsive to the counter E.M.F. of the motor, a second signal voltage source connected to be responsive to the voltage drop across the motor, an adjustable reference voltage signal source, means having a single electronic switch unit having a principle electrode-coupled with the first signal voltage source and a control electrode connected to the adjustable reference voltage signal source and a second principle electrode connected to control the output of the variable supply source, means including an electrical load providing a dynamic braking means connectible with the motor, and means having a second single electronic switch unit having a principle electrode coupled with the second signal source and a control electrode connected to the reference signal for controlling the connection between the electrical load and the motor.

4. In a control circuit, the combination comprising; an electrical load, a variable supply source for the load, a first signal voltage source responsive to the counter E.M.F. of the load, a second signal voltage source responsive to the voltage across the load, an adjustable reference signal source, means including a single tube having a cathode connected to the first signal source and a control grid connected to the reference signal source and an anode connected to said supply source for controlling the output of the supply source, and means including a second electronic tube having a control grid connected to the reference signal source and a cathode connected to the second signal source with an anode connected for controlling the energization of a control circuit independently of the control of the variable source by the first mentioned means.

5. In a control circuit, the combination comprising; an electrical load including a D.C. motor, a first voltage signal source responsive to the counter E.M.F. of the motor, a second voltage signal source responsive to the applied voltage across the motor armature from said variable source, an adjustable speed reference signal voltage source, means including a single electronic tube havin a cathode connected to the first signal source and a control grid connected to the reference signal source with an anode connected for controlling the input to the motor, second means including a single differential detector electronic tube having a cathode connected to the second signal source and a control grid connected to reference signal source with an anode connected to a means for controlling the application of a load to said motor independently of the control of the input to the motor by the first mentioned means, and means connected with the second means and said first mentioned means for causing the first mentioned means to reduce the input to the motor when the load is applied to the motor.

6. The combination as set forth in claim 5 wherein the differential detector tube is conductive in response to a difference normal to the signal voltages from the sources and is non-conductive in response to an increasing differential in the signals.

References Cited in the file of this patent

UNITED STATES PATENTS

| | | |
|---|---|---|
| 2,312,117 | Moyer et al. | Feb. 23, 1943 |
| 2,549,654 | Wittenberg | Apr. 17, 1951 |
| 2,721,968 | Brown | Oct. 25, 1955 |